US012784730B2

(12) United States Patent
Bean et al.

(10) Patent No.: US 12,784,730 B2
(45) Date of Patent: Nov. 3, 2026

(54) AMBIENT NOISE CAPTURE FOR SPEECH SYNTHESIS OF IN-GAME CHARACTER VOICES

(71) Applicant: Sony Interactive Entertainment Inc., Tokyo (JP)

(72) Inventors: Celeste M.B. Bean, San Francisco, CA (US); Landon G. Noss, Glendale, AZ (US)

(73) Assignee: Sony Interactive Entertainment Inc., Tokyo (JP)

( * ) Notice: Subject to any disclaimer, the term of this patent is extended or adjusted under 35 U.S.C. 154(b) by 261 days.

(21) Appl. No.: 18/180,665

(22) Filed: Mar. 8, 2023

(65) Prior Publication Data

US 2024/0304174 A1 Sep. 12, 2024

(51) Int. Cl.

*G10L 13/027* (2013.01)
*A63F 13/215* (2014.01)
*A63F 13/424* (2014.01)
*G10L 13/04* (2013.01)
*G10L 25/84* (2013.01)
*G10L 15/02* (2006.01)

(52) U.S. Cl.

CPC .......... *G10L 13/027* (2013.01); *A63F 13/215* (2014.09); *A63F 13/424* (2014.09); *G10L 13/04* (2013.01); *G10L 25/84* (2013.01); *G10L 2015/025* (2013.01)

(58) Field of Classification Search

CPC ....... G10L 13/027; G10L 13/04; G10L 25/84; G10L 15/26; G10L 2015/025; G10L 13/00; A63F 13/215; A63F 13/424; A63F 13/54

See application file for complete search history.

(56) References Cited

U.S. PATENT DOCUMENTS

| | | | | |
|---|---|---|---|---|
| 9,352,219 B2 * | 5/2016 | Bracken | .................. | A63F 13/45 |
| 10,719,592 B1 * | 7/2020 | Nichols | .................. | G10L 17/06 |
| 2007/0218987 A1 * | 9/2007 | Van Luchene | .......... | A63F 13/45<br>463/30 |
| 2007/0293315 A1 | 12/2007 | Mizuta | | |

(Continued)

OTHER PUBLICATIONS

Ramteke, Pravin Bhaskar, and Shashidhar G. Koolagudi. "Phoneme boundary detection from speech: A rule based approach." Speech Communication 107 (2019): 1-17. (Year: 2019).*

(Continued)

*Primary Examiner* — Hai Phan
*Assistant Examiner* — Nathan Tengbumroong
(74) *Attorney, Agent, or Firm* — Kilpatrick Townsend & Stockton LLP

(57) ABSTRACT

Methods and systems are presented for discerning background voices from ambient noise in a video game player's surroundings, isolating the voices using distinct phonemes within the voices, and running the phonemes through a generative artificial intelligence (AI) model to produce synthesized speech in the video game. The synthesized speech can be spoken by players or non-player characters, modified in age, gender, and other attributes of the avatar renderings. The text for the synthesized speech can be for static scripts or alterations based on gameplay. The player can select from different background voices and apply them to in-game characters and elements as desired.

17 Claims, 7 Drawing Sheets

(56) References Cited

U.S. PATENT DOCUMENTS

| | | | | |
|---|---|---|---|---|
| 2011/0238407 | A1* | 9/2011 | Kent | G10L 15/26 704/3 |
| 2020/0082805 | A1* | 3/2020 | Zhang | G10L 13/027 |
| 2020/0129860 | A1* | 4/2020 | Adams | G06N 3/096 |
| 2020/0152194 | A1* | 5/2020 | Jeong | G10L 13/047 |
| 2020/0251089 | A1* | 8/2020 | Pinto | A63F 13/54 |
| 2021/0151029 | A1* | 5/2021 | Gururani | G06N 3/0455 |
| 2021/0217404 | A1* | 7/2021 | Jia | G10L 17/04 |
| 2022/0172736 | A1* | 6/2022 | Wexler | G06V 20/10 |
| 2022/0230623 | A1 | 7/2022 | Byun et al. | |
| 2024/0105203 | A1* | 3/2024 | Bittner | G10L 21/0264 |

OTHER PUBLICATIONS

Kim et al., "GC-TTS: Few-shot Speaker Adaptation With Geometric Constraints", 2021 IEEE International Conference on Systems Man, and Cybernetics (SMC) Institute of Electrical and Electronics Engineers, 2021, pp. 1172-1177.
PCT/US2024/017309 , "International Search Report and Written Opinion", Apr. 26, 2024, 13 pages.
Application No. PCT/US2024/017309 , International Preliminary Report on Patentability, Mailed on Sep. 18, 2025, 9 pages.

* cited by examiner

AMBIENT NOISE CAPTURE FOR SPEECH SYNTHESIS OF IN-GAME CHARACTER VOICES

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

BACKGROUND

The capabilities of portable or home video game consoles, portable or desktop personal computers, set-top boxes, audio or video consumer devices, personal digital assistants, mobile telephones, media servers, and personal audio and/or video players and recorders, and other types of electronic devices are increasing dramatically. The devices can have enormous information processing capabilities, high quality audio and video outputs, large amounts of memory, and may also include wired and/or wireless networking capabilities. Additionally, relatively unsophisticated and inexpensive sensors, such as microphones, video camera, global positioning system (GPS) or other position sensors, when coupled with devices having these enhanced capabilities, can be used to detect subtle features about users and their environments. It is therefore desirable to develop new paradigms for audio, video, simulation techniques, or user interfaces that harness these enhanced capabilities.

For example, various gaming headsets or other types of headphones can have microphones for capturing ambient noise. In particular, the headphones may have noise canceling capabilities, in which the headphones can process the ambient, outside noise frequencies to facilitate emission of opposing noise signals that effectively cancel out the outside noise. The amount of sound data that is processed and canceled by sophisticated noise-canceling headphones is enormous.

There is a need in the art for more immersive video game experiences.

BRIEF SUMMARY

Techniques for improving a user video game experience are described. Generally, a computer system is used for presentation of video game-related information. The computer system can be communicatively coupled to, or include one or more sensors, such as a microphone. The computer system can further include one or more processors and one or more non-transitory computer readable storage media (e.g. one or more memories) storing instructions that, upon execution by the one or more processors, cause the computer system to perform operations.

As an aspect, the operations include receiving sound from the microphone in a room of an electronic device used by a user. The operations can also include distinguishing a background voice that is different from a user voice of the user and isolating phonemes from the background voice. The operations can further include determining that the phonemes are sufficient to synthesize speech and saving parameters derived from the phonemes. Additionally, the operations can include receiving text for synthesis and inputting the text for synthesis and the parameters into a generative artificial intelligence (AI) model for speech synthesis. The operations can also include receiving, from the model, audio data including synthesized speech of the text and playing the audio data.

An an aspect, the operation of determining that the phonemes are sufficient can be based on consonants and vowels in the text for synthesis.

As an aspect, the user can be playing a video game application on the electronic device, and the text for synthesis can come from the video game application. The operations may further include rendering a character in the video game to speak the synthesized speech. The operations may also include generating or altering words in the text for synthesis based on gameplay in the videogame application. The text for synthesis may be for static content selected from a group consisting of pre-canned speech from a non-player character, help information, and accessibility content. Additionally, the operations may include filtering synthesized speech in the audio data. The filtering can be selected from a group consisting of masculinizing or feminizing, aging or de-aging, and adjusting harmonics, pitch, or reverb. The filtering can be based on a gender, apparent age, or size of a character rendered to speak the synthesized speech. The operations may further include receiving, from the user, a selection of a non-player character among multiple non-player characters in the video game application to speak the synthesized speech.

As an aspect, the operations can further include distinguishing a second background voice from the first background voice and saving parameters derived from phonemes in the second background voice. Additionally, the operations can include mixing the parameters from the first and second background voices and the operation of inputting the text for synthesis and the parameters can include inputting the mixed parameters. The aspect can further include the operation of receiving, from the user, a command to avoid or stop using the second background voice.

As an aspect, the background voice can be a first background voice, and the operations can further include distinguishing multiple other background voices from the first background voice, saving parameters derived from phonemes in the other background voices, counting a number of the first and other background voices, and adjusting gameplay or audio of a video game application based on the number.

DETAILED DESCRIPTION

Figure 1:
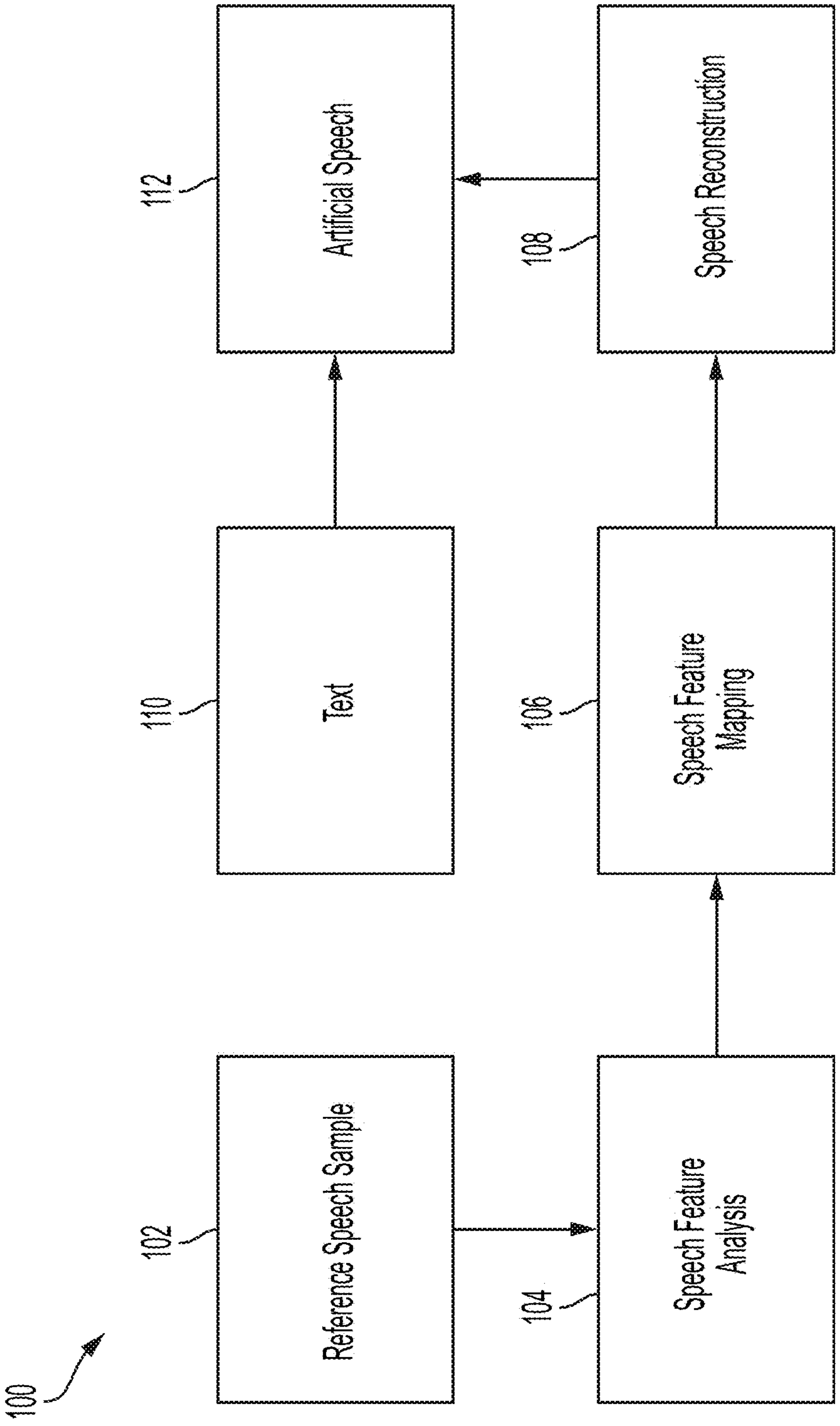
FIG. 1 illustrates an example of a system for performing speech synthesis according to embodiments of the present disclosure.

Generally, systems and methods for improving a user video game experience are described. In an example, the user video game experience is improved by augmenting video gameplay based on or using audio data collected from an environment in which the user is playing the video game. The augmentation of video gameplay need not change how a video game is developed or necessitate a common approach to video game development. Instead, instrumentation associated with the user video game experience are relied upon, where a video game platform (e.g. a server-based video game service), a headset, or other suitable instrumentation can collect and process audio data to augment video game activities, character speech, or otherwise customize video game functionalities for the user.

For instance, a method for augmenting video game activities can include receiving sound (i.e., audio data) from a microphone at, for example, a computer system. The microphone may be embedded in or otherwise associated with the headset, a laptop, a desktop accessory, or another suitable device which can be communicatively coupled with or included in the computer system. In response to receiving the sound, the method can also include the computer system parsing or sampling the sound to detect distinct voices. For example, the computer system can analyze frequency patterns, timbre, cadence, sharpness of speech, etc. of the sound to distinguish between a user voice and one or more background voices or sounds. The one or more background voices or sounds can occur in an environment proximate to the user and the microphone. Additionally, the one or more background voices or sounds may occur while the user is accessing a video game application (i.e., during video gameplay). The user may access the video game application via the computer system or via an electronic device communicatively coupled to the computer system.

In some examples, the computer system may continuously receive and sample sound from the environment during video gameplay. In other examples, the computer system may sample sound at the beginning or during particular portions (i.e., intermissions, pauses, etc.) of video gameplay. Additionally, in another example, the computer system may sample sound until a particular number of distinct voices, such as equal to a number of non-player characters in the video game application, are detected.

The method may further include the computer system deriving a voice fingerprint for one of the distinct background voices, which can include the frequency patterns, cadence, timbre, sharpness of speech, or other suitable distinguishing features of the background voice. The voice fingerprint can be a sample of audio data for the background voice. Derivation of the voice fingerprint can include requirements for determining the background voice is sufficiently distinct from previously known voices or sounds. The derivation may also require that sufficient information for reproducing the background voice has been collected. For example, the voice fingerprint may be derived after the computer system detects particular phonetic patterns (e.g., consonants, vowels, diagraphs, etc.) determined to be useful for reproducing speech. In another example, the voice fingerprint may be derived after the computer system detects at least a portion of the phonetic patterns included in a text for synthesis. The text for synthesis can be the text that will be spoken by the reproduced (i.e., artificial) background voice.

Once derived, the voice fingerprint can be saved on a video game console, to a cloud server, or otherwise saved for future accessibility. Additionally, the method can include saving parameters based on the voice fingerprint. The parameters can be based on the distinguishing features of the background voice and may include pitch, loudness, intensity, timbre, cadence, sharpness of speech, reverberation, or other suitable parameters that can be extracted from audio data or predicted based on the audio data. A sample of audio data associated with the voice fingerprint may be used for determining the parameters. In some examples, the sample of audio data may be segmented, and parameters may be determined for each segment. For example, the sample of audio data may be segmented based on phonemes. The parameters can be determined by applying Fast Fourier Transform (FFT) or other suitable mathematical transformations or techniques to the sample of audio data. The FFT or other suitable mathematical techniques can translate audio data to the frequency domain to enable analysis of frequency information, amplitude information, or other suitable information about the waveform of the audio data, which can be useful for determining the parameters. For example, the pitch can be determined based on a lowest frequency (i.e., fundamental frequency) of the sample or for a segment of the sample and the loudness can be determined based on amplitude (i.e., energy) of the sample or a segment of the sample.

The method can further include inputting the parameters into an artificial intelligence (AI) model in conjunction with the text for synthesis. The AI model can be a generative or a text-to-speech AI model developed for producing artificial speech of the text for synthesis that sounds the same or similar to the background voice (i.e., for synthesizing speech). In some examples, an algorithm implemented by the AI model can include isolating phonemes from the text for synthesis, predicting pitch, energy, duration, etc. of the isolated phonemes based on the saved parameters, generating a spectrogram based on the predictions, and converting the spectrogram to waveform (i.e., audio) which can be output to speakers.

In a particular example, the computer system may use the Microsoft VALL-E neural codec language model by inputting a three second sample of the background voice and the text for synthesis into the VALL-E model. The VALL-E model can, based on the three second sample, output synthesized speech. The synthesized speech may mimic the timbre, rhythm, emotional tone, etc. of the background voice.

Additionally, the method can include playing the synthesized speech in accordance with, for example, the video game application. To illustrate, consider an example of a video game activity related to capturing or defeating a non-player character (NPC) against which an avatar controlled by the user is opposed in a combat activity. The system can use the background voice as reference audio for the NPC and the text for synthesis may be pre-canned speech for the NPC associated with the combat activity and obtained from the video game application. In response to receiving the pre-canned speech and the parameters, the generative AI model can output audio data that includes synthesized speech. The audio data can be played during the combat activity to cause the NPC to sound the same or similar to the background voice.

Embodiments of the present disclosure can provide technical advantages over existing techniques for augmenting video gameplay. For example, by using background voices for the synthesized speech, realism of the video gameplay can be enhanced. Additionally, the collection of audio data from the environment can enable voices in an augmented video game to be higher quality than, for example, standard artificial voices of NPCs. The use of background voices can also enable personalization of the video gameplay. The synthesized speech may also be used for more efficient development of new and unique voices for other video game applications. Additionally, current systems for deploying video game applications may have microphones and therefore may collect audio data. However, the current systems make limited use of the audio data. Thus, the present disclosure can use the audio data that is already being collected to improve and augment video gameplay.

FIG. 1 illustrates an example of a system 100 for performing speech synthesis according to one example of the present disclosure. Speech synthesis can be artificial simulation of human speech, and the system 100 can be or can include a text-to-speech or a generative artificial intelligence (AI) model for performing the speech synthesis. The goal of speech synthesis can be to execute vocal conversion (VC) such that artificial speech 112 of text 110 can mimic a vocal style of a reference speech sample 102. Thus, the text-to-speech or generative AI model can be trained to generate the artificial speech 112 based on the reference speech sample 102.

To detect a distinct voice that can be used to generate the reference speech sample 102, the system 100 can, via a microphone, capture audio data. The system can further parse the audio data to discern frequency patterns, timbre, cadence, sharpness of speech, or other suitable features of the audio data indicative of a distinct voice. In an example, the system 100 can identify a distinct voice based on linguistic features, segmental features, or supra-segmental features. The linguistic features can be word choice, sentence structure, or other linguistic features of speech determined by analysis of lexical choice, lexical features (i.e., word length, word frequency, etc.), speech habits, etc. The segmental features may include frequency, amplitude, or other suitable information associated with segments (e.g., phonemes) of the audio data. The supra-segmental features can result from putting sounds together to form speech. Examples of supra-segmental features can include pitch, stress, segment length, tone, intonation, etc.

The system 100 may further generate the reference speech sample 102 for the distinct voice based on sufficient information being collected from the audio data. For example, the system 100 can isolate phonemes from the audio data and can generate the reference speech sample 102 based on a sufficient number of phonemes being isolated. In some examples, the system 100 may determine the sufficient number of phonemes or another measure of sufficient information based on characteristics of the text 110, such as based on consonants and vowels in the text 110. For example, a minimum of 1, 2, 3, 4, 5, 6, 7, 8, 9, 10, 12, 15, 17, 20, 25 or other number for each distinct phoneme in a set of phonemes may be required. The numbers required may be different for different language, dialects, or local custom. The system 100 generating the reference speech sample 102 based on sufficient information in the audio data can increase an accuracy of the speech synthesis.

After generating the reference speech sample 102, the system can perform speech feature analysis 104 on the reference speech sample 102. During the speech feature analysis 104, the system 100 can obtain specific information or values for the linguistic features, segmental features, or supra-segmental features used in associating the reference speech sample 102 with a distinct voice. Then, the system 100 can perform speech feature mapping 106 to map the features of the reference speech sample 102 to target features of the artificial speech 112. For example, for each of the phonemes included in the text 110 the system 100 can predict, based on the speech feature analysis 104, the frequency, amplitude, and other suitable features of a sound wave. Then, the predicted features can be mapped, such as in the form of a spectrogram. The spectrogram can be a virtual representation of the sound wave as it is predicted and as varies over time for the text 110.

Additionally, the speech feature mapping 106 can be used in speech reconstruction 108 to create audible data of the text 110 with the predicted features. For example, the spectrogram can be translated to the audible data, which can be output to speakers. Therefore, the result of the speech reconstruction 108 can be artificial speech 112 that mimics the vocal style of the reference speech sample 102.

Figure 2:
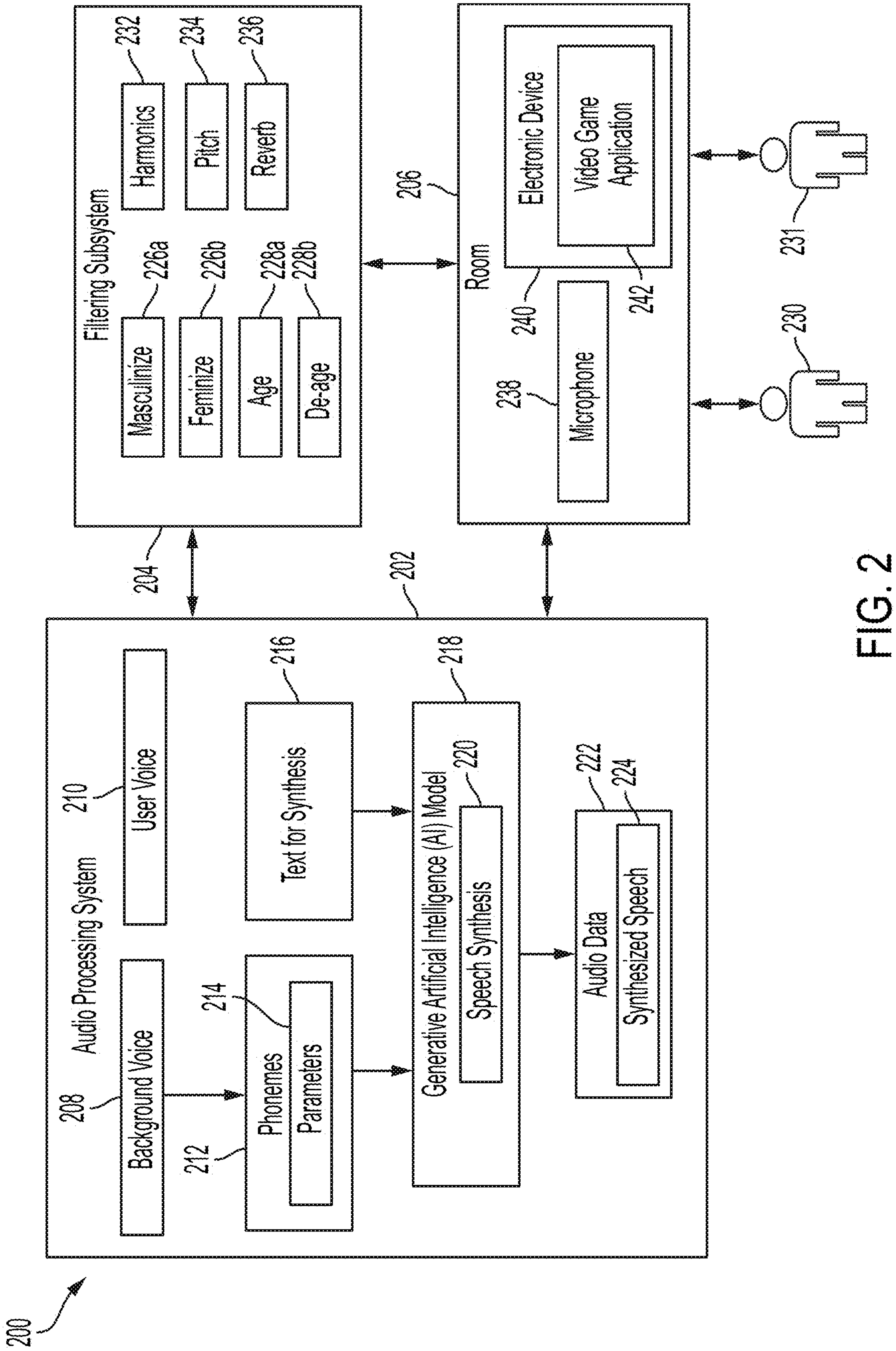
FIG. 2 illustrates an example of a system for using ambient noise to augment video gameplay according to embodiments of the present disclosure.

FIG. 2 illustrates an example of a system 200 for using ambient noise to augment video gameplay according to embodiments of the present disclosure. The system 200 can include an audio processing system 202 for processing audio data and generating synthesized speech 224. The system 200 can receive, at the audio processing system 202, the audio data from a microphone 238 in a room 206. The room 206 can include an electronic device 240, such as a phone, laptop, personal computer, tablet, or other suitable electronic device, which can be used by a user 230 for accessing a video game application 242. The microphone 238 can be included in the electronic device 240 or the microphone can be included in a headset worn by the user 230, a desktop accessory, or otherwise placed in the room 206.

The system 200 can further, via the audio processing system 202, distinguish between a background voice 208 associated with a person 231 that is different than a user voice 210 associated with the user 230. The person 231 may be in the room 206 or otherwise close enough to the microphone 238 for sound from the person 231 to be received. The system 200 may distinguish the background voice 208 from the user voice 210 based on one or more features of the background voice 208 that are unique in comparison to the user voice 210. For example, the one or more features can be pitch, timbre, cadence, sharpness of speech, etc. In a particular example, the user 230 can be a child playing a children's video game on the electronic device 240 and the person 231 can be the mother of the child. Thus, the system 200 may distinguish between the child's voice and the mother's voice based on, for example, the audio data collected for the child indicating a higher pitch and a different cadence than audio data collected for the mother.

Additionally, the system 200 can isolate phonemes 212 from the background voice 208. For example, the system 200 may sample the background voice 208 over a period of time during which the system 200 can be isolating the phonemes 212. In the particular example, the system 200 may collect audio data via the microphone 238 of the mother speaking. The system 200 can isolate words in whatever sentence the mother is speaking and then can further isolate the phonemes 212 from each of her words. The phonemes 212 are the smallest units of sound in speech that distinguish words or word elements from one another. Examples of phonemes can include long vowel phonemes, short vowel phonemes, consonant phonemes, diagraph phonemes, etc.

By distinguishing between the user voice 210 and the background voice 208 and isolating the phonemes 212, the system 200 can derive a voice fingerprint for the background voice 208. The voice fingerprint can be used as reference audio for the video game application 242. There can be requirements for collecting sufficient information about the background voice 208 to derive the voice fingerprint. The requirements can further be associated with collecting sufficient information about the background voice 208 for which synthesized speech 224 of the background voice 208 can be generated. For example, the system 200 can determine that the isolated phonemes 212 are sufficient in number and signal-to-noise ratio for synthesizing speech. For example, the system 200 can determine that a sufficient number of unique phonemes have been isolated from the background voice 208. In some examples, the system 200 can determine that the phonemes 212 are sufficient based on text for synthesis 216. For example, the text for synthesis 216 can include consonants, vowels, diagraphs, etc. and the system 200 can determine that the phonemes 212 are sufficient based on at least a portion of the phonemes 212 being associated with at least a portion of the consonants, vowels, diagraphs, etc.

The system 200 can also save parameters 214 derived from the phonemes 212. In some examples, the system 200 can derive the parameters 214 directly from audio data associated with each of the phonemes 212. Additionally, the system 200 may apply Fast Fourier Transform (FFT) or other suitable mathematical transformations or techniques to the audio data associated with each of the phonemes 212 to put the audio data in the frequency domain. This can enable the system 200 to analyze of frequency information, amplitude information, or other suitable information about the waveform of the audio data for each of the phonemes, which can be useful for determining the parameters 214.

Additionally or alternatively, the system 200 may generate a spectrogram based on the audio data associated with each of the phonemes 212, which can serve as a visual representation of features of the phonemes 212. The features may include frequency patterns, amplitudes, duration, etc. for each of the phonemes 212. Then, the system 200 may analyze the features to derive the parameters 214. In some examples, the parameters 214 can be calculated for each of the phonemes 212, for sets of the phonemes 212, or can be averaged or otherwise calculated for all of the phonemes 212. The parameters can include pitch, loudness, intensity, timbre, cadence, reverberation, etc.

In the particular example, the pitch of the background voice 208 (i.e., the mother's voice) can be determined based on a lowest frequency (i.e., fundamental frequency) of audio data for the phonemes 212. The loudness of the background voice 208 can be estimated based on amplitudes (i.e., energy) of the audio data for the phonemes 212. The intensity of the background voice 208 can be a measurement of energy transmitted through a unit area per unit time. Additionally, the timbre of the background voice 208 can be determined based on harmonic content of the audio data for the phonemes 212. The harmonic content can be based on a number of or relative intensity of harmonics, where the harmonics can be frequencies that are an integer multiple of the fundamental frequency. The cadence of the background voice 208 can be determined based on harmonic changes or durations of the phonemes 212 or the sets of the phonemes 212. The sharpness of speech for the background voice 208 can be determined based on changes in pitch, loudness, intensity, or a combination thereof. The reverberation can be determined by a time it takes for the intensity or amplitude of the audio data for the phonemes 212 to decay by a certain amount (e.g., decay by 60 decibels (dB)).

After the parameters 214 are derived, the system 200 can input the text for synthesis 216 and the parameters 214 into a generative artificial intelligence (AI) model 218. In the particular example, the user 230 can be playing a learning game on the video game application 242 (i.e., the children's video game). The learning game can involve a non-play character (NPC) presenting questions for the user 230 to answer. Thus, the text for synthesis 216 input into the generative AI model 218 can be pre-canned speech of the questions for the learning game. In other examples, the text for synthesis 220 can be help information or accessibility content associated with the video game application 242. Additionally, in some examples, the text for synthesis 216 can be generated by the video game application 242 based on an action performed by the user 230 during video game play. For example, the user 230 can be playing a video game application 242 that involves a combat activity against an NPC, and the text for synthesis 216 can be generated in response to the player performing a particular move in the combat activity.

The generative AI model 218 can be trained to predict how consonants, vowels, diagraphs etc. of the text for synthesis 216 may sound in the background voice 208 to generate the words, phrases, etc. of the text for synthesis 216. Therefore, the generative AI model 218 can output audio data 222 that can include synthesized speech 224 of the text for synthesis 216. The synthesized speech 224 can have features similar to the background voice 208, such as similar pitch, intensity, and cadence. The system 200 can then receive the audio data 222 including the synthesized speech 224 from the generative AI model 218. The system 200 can further play the audio data 222 in accordance with the video game application 242. In the particular example, the generative AI model 218 can output audio data 222 with the synthesized speech 224 of the questions and can play the audio data 222 to cause the NPC to sound like the mother when presenting the questions to the user 230.

In some examples, the system 200 can also include a filtering subsystem 204 for filtering the audio data 222 to alter one or more attributes of the synthesized speech 224. The filtering of the audio data 222 can also remove noise or other undesirable characteristics of the audio data 222. In some examples, the audio data 222 can be filtered using a low pass filter to remove high frequency information or a high pass filter to remove low frequency information. Additional filters may include a band-pass filter, a band-stop filter, etc. In this way, the filtering subsystem 204 may alter harmonics 232, pitch 234, or reverb 236 of the synthesized speech 224. The filtering subsystem 204 can also masculinize 226*a*, feminize 226*b*, increase age 228*a*, de-age 228*b*, or otherwise alter the synthesized speech 224. For example, removing high frequency information via a low pass filter may masculinize 226*a* the synthesized speech.

Additionally or alternatively, any of the parameters 214 can be adjusted via the filtering subsystem 204 to alter the synthesized speech 224. For example, a frequency (i.e., pitch) of the synthesized speech 224 can be decreased to masculinize 226*a* the synthesized speech 224, or the frequency can be increased to feminize 226*b* the synthesized speech 224. Additionally, decreasing an intensity or loudness of the synthesized speech 224 can age 228*a* the synthesized speech or increasing the intensity or loudness may de-age 228*b* the synthesized speech 224. The aging 228*a* of the synthesized speech 224 can also include decreasing the frequency or, for the de-aging 228*b*, increasing the frequency. The harmonics 232, pitch 234, or reverb 236 may also be adjusted. In some examples, the user may be able to apply a filter by adjusting the parameters via a graphical user interface (GUI) or other suitable mechanism. For example, the GUI may include a sliding mechanism or other options for increasing or decreasing frequencies, amplitude, reverb, etc.

In some examples, the filtering can be performed based on characteristics of an NPC that will appear to speak the synthesized speech 224, such as based on a gender, apparent age, or size of the NPC. In an example, the video game application 242 can have multiple NPCs from which the user 230 can select to speak the synthesized speech 224, and the synthesized speech 224 may be filtered based on the characteristics of the selected NPC.

Additionally, in some examples, the filtering can enable the user 230 to disguise his or her own voice. For example, the user 230 may be able to adjust, via the GUI, his or her own voice or a background voice. Then the adjusted voice can be used as the voice of an avatar for the user 230 in the video game application 242 or as the voice of the user 230 when communicating with other users of the video game application 242.

In another example, the adjusted voice can be an amalgamation of multiple background voices or of the user voice and a background voice. In some examples, the system 200 may further enable the user 230 to use voice prompts to initialize the avatar, initialize a video game activity, or control other suitable aspects of the video game application 242.

Figure 3:
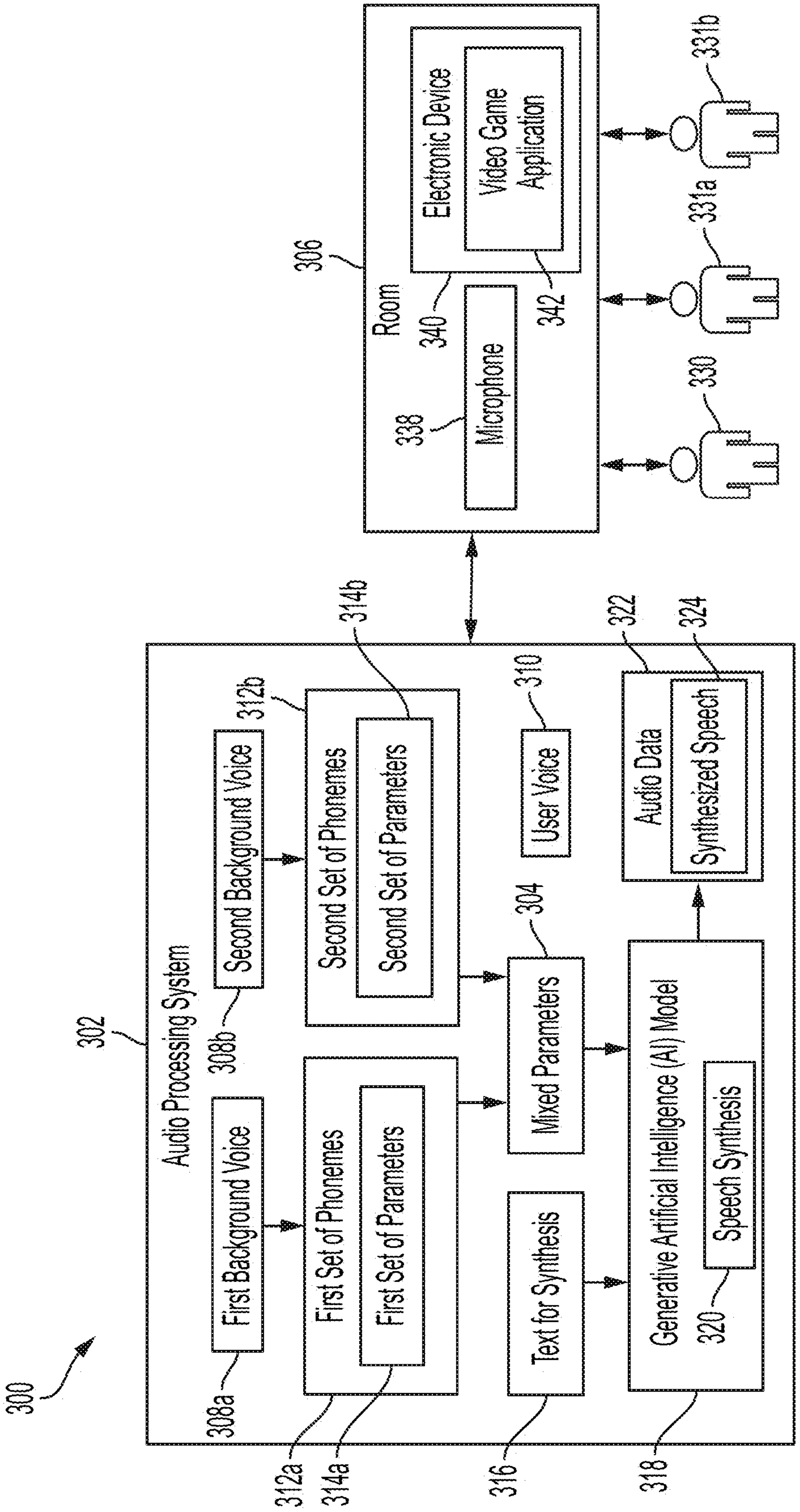
FIG. 3 illustrates another example of a system for using ambient noise to augment video gameplay according to embodiments of the present disclosure.

FIG. 3 illustrates another example of a system 300 for using ambient noise to augment video gameplay according to embodiments of the present disclosure. The system 300 can include an audio processing system 302 for processing audio data and generating synthesized speech 324. The system 300 can receive, at the audio processing system 302, the audio data from a microphone 338 in a room 306. The room 206 can include an electronic device 340, such as a phone, laptop, personal computer, tablet, or other suitable electronic device, which can be used by a user 330 for accessing a video game application 342. The microphone 338 can be included in the electronic device 340, or the microphone can be included in a headset worn by the user 330, a desktop accessory, or otherwise placed in the room 306.

The system 300 can, via the audio processing system 202, distinguish between a first background voice 308*a* associated with a first person 331*a* and a user voice 310 associated with the user 330. The first person 331*a* may be in the room 306 or otherwise close enough to the microphone 338 for sound from the first person 331*a* to be received. Additionally, there can be a second person 331*b* close enough to the microphone 338 for sound to be received. Thus, the system 300 can further, via the audio processing system 302, distinguish between a second background voice 308*b* associated with the second person 331*b*, the first background voice 308*a*, and the user voice 310. The system 300 may distinguish the background voices 308*a-b* from each other and from the user voice 310 based on one or more features of the background voices 308*a-b* that are unique in comparison to each other and the user voice 310. For example, the one or more features can be pitch, timbre, cadence, sharpness of speech, etc.

In some examples, the system 300 may derive voice fingerprints for each of the background voices 308*a-b*. The voice fingerprints can be sample audio data for the background voices 308*a-b* and can be used as reference audio for the video game application 342. In an example, the system may isolate a first set of phonemes 312*a* for the first background voice 308*a* and may isolate a second set of phonemes 312*b* for the second background voice 308*b*. Then, the system 300 may derive a first set of parameters 314*a* based on the first set of phonemes 312*a* and may derive a second set of parameters 314*b* based on the second set of phonemes 312*b*. The system 300 may further save the voice fingerprints, including the sets of phonemes 312*a-b* and the sets of parameters 314*a-b*, on the electronic device 340, in a cloud server, or in another suitable location. Any number of voice fingerprints can be saved, and the user 330 may be permitted to access the saved voice fingerprints to choose which background voices to use for the video game application 342.

Additionally, the system 300 can receive text for synthesis 316 from the video game application 342. For example, the user 330 may request, via the electronic device 340, that the first background voice 308*a* be used for a particular NPC in the video game application 342. The user 330 may also request that the second background voice 308*b* be used for providing help information. Therefore, the system 300 may receive pre-canned speech for the particular NPC and the help information as the text for synthesis 316. Moreover, the system 300 can input the pre-canned speech and the first set of parameters 314*a* into a generative AI model 318. As a result, the generative AI model 318 can output first audio data with first synthesized speech. The system may also input the help information and the second set of parameters 314*b* in the generative AI model 318, which can output second audio with second synthesized speech. The first and second audio data can be played in accordance with the video game application to cause the particular NPC to sound the same or similar to the first background voice 308*a* and to cause the help information provided to the user to sound the same or similar to the second background voice 308*b*.

In some examples, the user 330 may transmit a command to the system 300 requesting that the system 300 avoid or stop using one or both of the background voices 308*a-b*. n an example, the command may further indicate one or more new background voices to use for the video game application 342 in place of one or both of the background voices 308*a-b*. Additionally, in some examples, the user may transmit the command to the system to request that the first background voice 308*a* be used for a different NPC or may request any other suitable change with respect to the saved voice fingerprints and the video game application 342.

Additionally or alternatively, the system 300 may generate mixed parameters 304 based on the sets of parameters 314*a-b*. For example, the mixed parameters 304 may include the pitch, intensity, and loudness of the first set of parameters 314*a* and may include the cadence, timbre, and reverberation of the second set of parameters 314*b*. In another example, the sets of parameters 314*a-b* can be averaged or otherwise combined to generate the mixed parameters 304. The system 300 may then input the mixed parameters 304 into the generative AI model with text for synthesis 316. As a result, the generative AI model 318 can output audio data 322 with synthesized speech 324 of the text for synthesis 316. The audio data 322 can be played in accordance with the video game application 342, which may cause an NPC or other suitable aspect of the video game application 342 to sound similar to both of the background voices 308*a-b*. For example, when the audio data 322 is played, the synthesized speech 320 can be similar in pitch to the first background voice 308*a* and similar in cadence to the second background voice 308*b*. In another example, inputting the mixed parameters 304 may result in the synthesized speech 324 sounding more similar to one of the background voices 308*a-b* or sounding significantly different from both of the background voices 308*a-b*.

The system 300 may distinguish any number of background voices. The system 300 may also save parameters associated with each of the background voices. In an example, the system may distinguish a number background voices equal to a number of NPCs in the video game application 342. In another example, the system 300 may count a number of background voices and may adjust the video game application 342 based on the number. For example, the system 300 may change a level of audio for the video game application 342, change an amount of background noise for the video game application 342, may pause or otherwise alter gameplay of the video game application 342, etc. By adjusting audio or gameplay of the video game application 342 based on the number of background voices, the system 300 can improve user experience. For example, the system 300 may increase the level of audio and the amount of background noise for the video game application 342 in response to detecting a number of background voices that exceeds a threshold, thereby reducing a risk of distraction for the user 330. Additionally or alternatively the system may detect non-human audio (e.g., dogs barking, parakeet squawking, doorbell, vacuum cleaner, box fan, etc.). Therefore, the system 300 may adjust the audio or gameplay based on the non-human audio or based on a combination of the non-human audio and the background voices.

Figure 4:
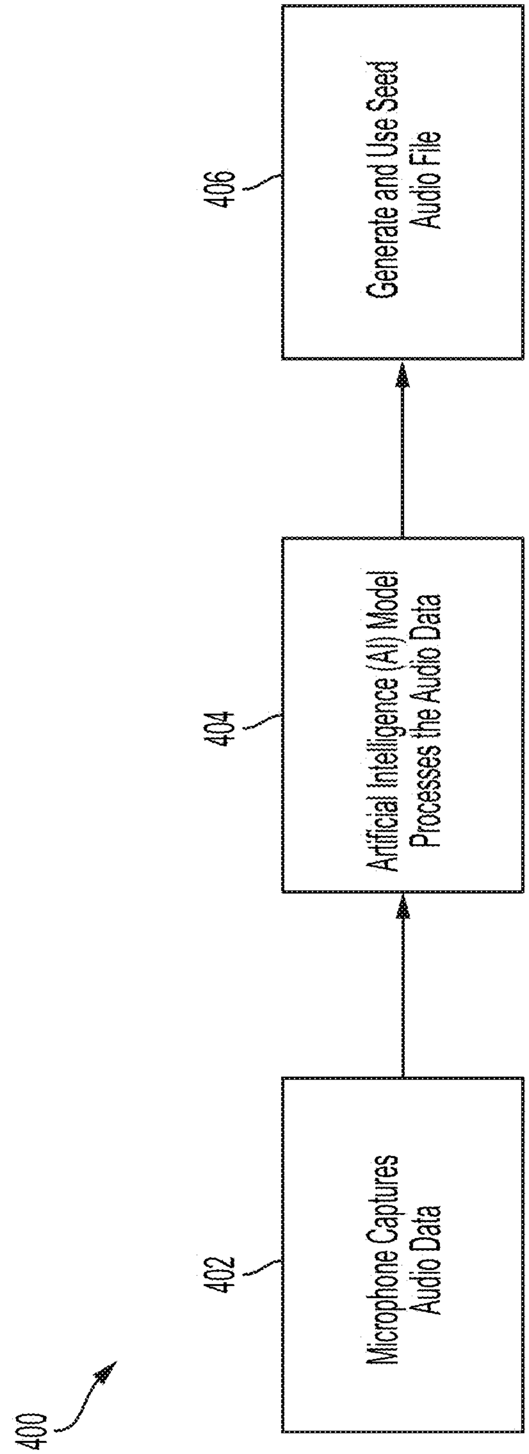
FIG. 4 illustrates an example of a process for using ambient noise to augment video gameplay according to embodiments of the present disclosure.

FIG. 4 illustrates an example of a process 400 for using ambient noise to augment video gameplay according to embodiments of the present disclosure. Aspects of FIG. 4 are discussed in reference to the components in FIG. 2. The operations of the process 400 can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

In an example, the process 400 includes operation 402, where the computer system can, via a microphone 238 (see FIG. 2), capture audio data. The microphone 238 may be communicatively coupled with the computer system. For example, the microphone may be embedded in a headset, desktop accessory, or the computer system itself. The microphone 238 and computer system may be in a room 206 and a user 230 may be using the computer system to access a video game application 242. The audio data captured can be from a user voice 210, background noise in or near the room 206, one or more background voices in or near the room 206, or a combination thereof.

In an example, the process 400 includes operation 404, where the computer system can, via an artificial intelligence (AI) model, process the audio data. For example, the computer system can process the audio data to distinguish between the user voice 210 (see FIG. 2) and a background voice 208. The computer system may distinguish between the user voice 210 and the background voice 208 by detecting pitch, cadence, timbre, or other suitable features of the background voice 208 and compare the features to features of the user voice 210. The computer system may also determine that the background voice 208 is not included in a set of previously known background voices or sounds.

After the background voice 208 is distinguished from the user voice 210 and the set of previously known background voices or sounds, the computer system can sample the background voice 208 to derive a voice fingerprint for the background voice 208. The voice fingerprint can be a sampling of audio data from the background voice 208 and may include enough information for performing speech synthesis. For example, the voice fingerprint can include a variety of phonemes 212. The computer system may further isolate the phonemes 212 from the voice fingerprint and can derive parameters 214 from the phonemes 212. The parameters 214 may include pitch, loudness, cadence, timbre, reverberation, intensity, etc.

The computer system can also receive text for synthesis 216. For example, the text for synthesis 216 can be pre-canned speech or generated speech for a non-player character (NPC) in the video game application 242. The text for synthesis 216 can also be help information or accessibility content from the video game application 242. The computer system can input the text for synthesis 216 and the parameters 214 into the AI model. The AI model can be trained to predict features of audio data for the text for synthesis 216 based on the parameters 214. In other words, the AI model can be trained to perform speech synthesis.

In an example, the process 400 includes operation 406, where the computer system can generate and use a seed audio file. For example, in response to receiving the text for synthesis 216 (see FIG. 2) and the parameters 214, the AI model can input a seed audio file. The seed audio file can include synthesized speech 224 of the text for synthesis 216. The seed audio file can be run through speaker adaptation to generate a waveform for output to speakers. Thus, the seed audio file can be played in accordance with the video game application 242 to, for example, cause the NPC to sound the same as or similar to the background voice 208.

In a particular example, the video game application 242 can be a horror game with multiple NPC that are meant to scare the user 230 during video gameplay. In the particular example, the background voice 208 can be a sibling of the user 230. The user 230 may select a particular NPC for which a seed audio file associated with the sibling's voice can be used. Therefore, the text for synthesis 216 can be pre-canned speech obtained from the horror game for the particular NPC. Additionally, the seed audio file may be filtered to remove high frequency information, and the intensity of the seed audio file may be increased. The filtering can cause the user to perceive the synthesized speech 224 of the seed audio file as scarier that if it was unfiltered to improve user experience during the horror game.

Figure 5:
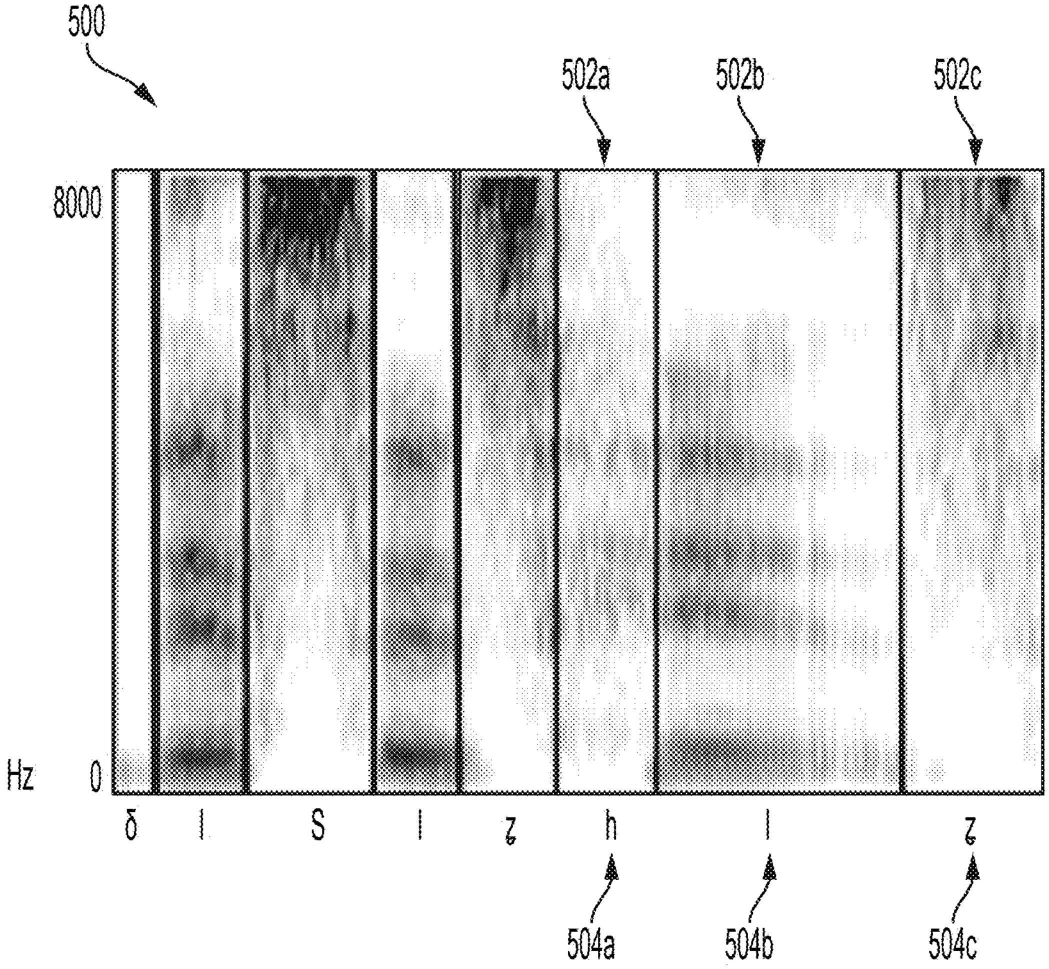
FIG. 5 illustrates an example of a graph for characterizing ambient noise according to embodiments of the present disclosure.

FIG. 5 illustrates an example of a graph 500 for characterizing ambient noise according to embodiments of the present disclosure. The graph 500 can be a spectrogram, which can provide a visual representation of the ambient noise. The x-axis of the graph 500 includes time information, and the y-axis of the graph 500 includes frequency information. The graph 500 is split into sections that correspond to phonemes isolated from the ambient noise. For example, a first section 502*a* corresponds to a first phoneme 504*a*, a second section 502*b* corresponds to a second phoneme 504*b*, and a third section 502*c* corresponds to a third phoneme 504*c*. The phonemes 504*a-c* be representative of a word. In particular, the phonemes 504*a-c* can represent the word "his".

The graph 500 can be used to analyze features of the ambient noise, distinguish between voices included in the ambient noise, derive parameters from the phonemes 504*a-c*, or perform other suitable operations with respect to the ambient noise. In an example, the width of the sections 502*a-c* can correspond to duration for each of the phonemes 504*a-c*, the vertical lines within the sections 502*a-c* can show the frequencies present for each of the phonemes 504*a-c*, and the brightness of areas in each of the sections 502*a-c* can indicate amplitude. For example, darker areas can represent higher amplitudes. Additionally, in some examples, a generative AI model can output synthesized speech based on a voice detected from the ambient noise, and a spectrogram may be generated for the synthesized speech. The spectrogram may be used to generate audible data of the synthesized speech that can be output to speakers.

Figure 6:
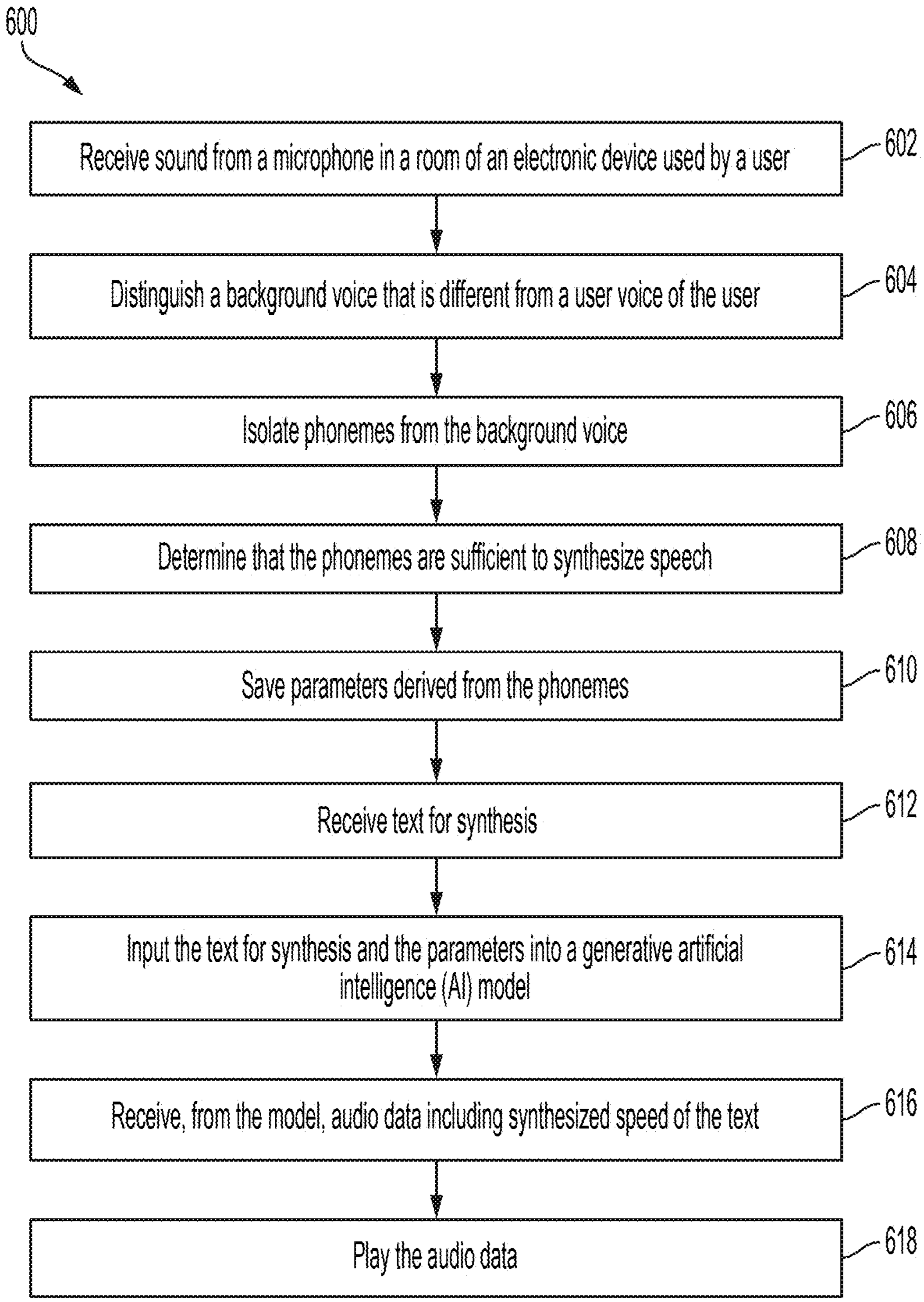
FIG. 6 illustrates another example of a process for using ambient noise to augment video gameplay according to embodiments of the present disclosure.

FIG. 6 illustrates an example of a process 600 for using ambient noise to augment video gameplay according to embodiments of the present disclosure. Aspects of FIG. 6 are discussed in reference to the components shown in FIGS. 2 and 3. The operations of the process 600 can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

In an example, the process 600 includes operation 602, where the computer system can receive sound from a microphone in a room of an electronic device 340 used by a user. In some examples, the user can be using the electronic device to access a video game application. The microphone can be included in the computer system, the electronic device, a headset, a desktop accessory, or otherwise located in the room proximate to the user. The sound received by the computer system can be a user voice, non-human background noise (e.g., dog barking, fan, etc.), or one or more background voices.

In an example, the process 600 includes operation 604, where the computer system can distinguish a background voice that is different from the user voice of the user. The computer system may distinguish the background voice based on one or more features of the background voice being substantially distinct from the user voice. The computer system may also determine that the background voice is substantially distinct from previously detected background voices. The features may include pitch, intensity, loudness, cadence, reverb, sharpness of speech, etc.

In an example, the process 600 includes operation 606, where the computer system can isolate phonemes from the background voice. For example, the system can isolate words spoken by the background voice and then can further isolate the phonemes from each of the words. The phonemes can be the smallest units of sound in speech that distinguish words or word elements from one another. Examples of phonemes can include long vowel phonemes, short vowel phonemes, consonant phonemes, diagraph phonemes, etc.

In an example, the process 600 includes operation 608, where the computer system can determine that the phonemes are sufficient to synthesize speech. For example, the computer system may determine that the phonemes are sufficient based on frequency information associated with the phonemes spanning frequency range that exceeds a threshold frequency range. In another example, the computer system may determine that the phonemes are sufficient based on there being a sufficient number of unique phonemes collected.

In some examples, determining that the phonemes are sufficient can be based on consonants and vowels in text for synthesis. Thus, the computer system may determine that the phonemes are sufficient based on at least a portion of the phonemes being representative of at least a portion of the consonants and vowels in the text for synthesis. For example, there can be a first threshold associated with vowels and a second threshold associated with consonants. Thus, determining that the phonemes are sufficient may include determining that a first subset of the phonemes is associated with vowels and a second subset of the phonemes is associated with consonants. Then, the determining that the phonemes are sufficient may include determining that a number of phonemes in the first subset exceeds the first threshold and/or determining that a number of phonemes in the second subset exceeds the second threshold.

In an example, the process 600 includes operation 610, where the computer system can save parameters derived from the phonemes. The computer system may determine the parameters for each of the phonemes or for a combination of the phonemes. The parameters may include timbre, pitch, loudness, intensity, cadence, reverberation, sharpness of speech, harmonics, etc.

In an example, the process 600 includes operation 612, where the computer system can receive the text for synthesis. The text for synthesis can come from the video game application. For example, the text for synthesis can be for static content, such as pre-canned speech from a non-player character (NPC), help information, accessibility content, or other suitable static content. Additionally, in some examples, the computer system may generate or alters the text for synthesis based on gameplay in the video game application.

In an example, the process 600 includes operation 614, where the computer system can input the text for synthesis and the parameters into a generative artificial intelligence (AI) model for speech synthesis. The AI model can be trained to perform speech synthesis. Thus, in response to receiving the text for synthesis and the parameters, the generative AI model can output audio data with synthesized speech. In an example, an algorithm implemented by the generative AI model can include predicting pitch, energy, duration, etc. of phonemes in the text for synthesis based on the parameters and generating audio data based on the predictions.

In an example, the process 600 includes operation 616, where the computer system can receive, from the generative AI model, the audio data including the synthesized speech of the text. The synthesized speech can have similar features to the background voice. In some examples, the process 600 may further include the computer system filtering the synthesized speech. The filtering may include masculinizing or feminizing the synthesized speech, aging or de-aging the synthesized speech, adjusting harmonics, adjusting pitch, adjusting reverb, or otherwise filtering the synthesized speech. Additionally, the filtering may be performed based on a gender, apparent age, or size of a character in the video game application rendered to speak the synthesized speech.

For example, for a character appearing to be young, the computer system may de-age the synthesized speech.

In an example, the process includes operation 618, where the computer system can play the audio data. For example, the computer system may play the audio data in accordance with the video game application to cause the character in the video game application to sound the same as or similar to the background voice. In some examples, the computer system may receive, from the user, a selection of a character from among multiple characters in the video game application to speak the synthesized speech. In other examples, the computer system may automatically select a character and cause the character to speak the synthesized speech.

Additionally or alternatively, the process 600 can include an operation where the background voice can be a first background voice and the computer system may distinguish a second background voice from the first background voice. Additionally, the parameters for the first background voice can be a first set of parameters can the computer system can also save second set of parameters derived from phonemes isolated from the second background voice. In some examples, the computer system may input the second set of parameters and text for synthesis into the generative AI model to generate additional audio data with addition synthesized speech. The additional audio data can be played in accordance with the video game application to, for example, cause a second character to sound the same or similar to the second background voice. Additionally or alternatively, the computer system can mix the parameters from the background voices and the input the mixed parameters into the generative AI model. The computer system may also receive, from the user, a command to avoid or stop using the first or second background voices.

In another example, the process 600 can include an operation where the computer system may distinguish multiple other background voices from the first background voice and may save parameters derived from phonemes for the other background voices. In the example, the computer system can count a number of the background voices and may adjust gameplay or audio of the video game application based on the number. For example, if the number exceeds a threshold, the computer system may increase an audio level of the video game application or may increase background noise for the video game application.

Figure 7:
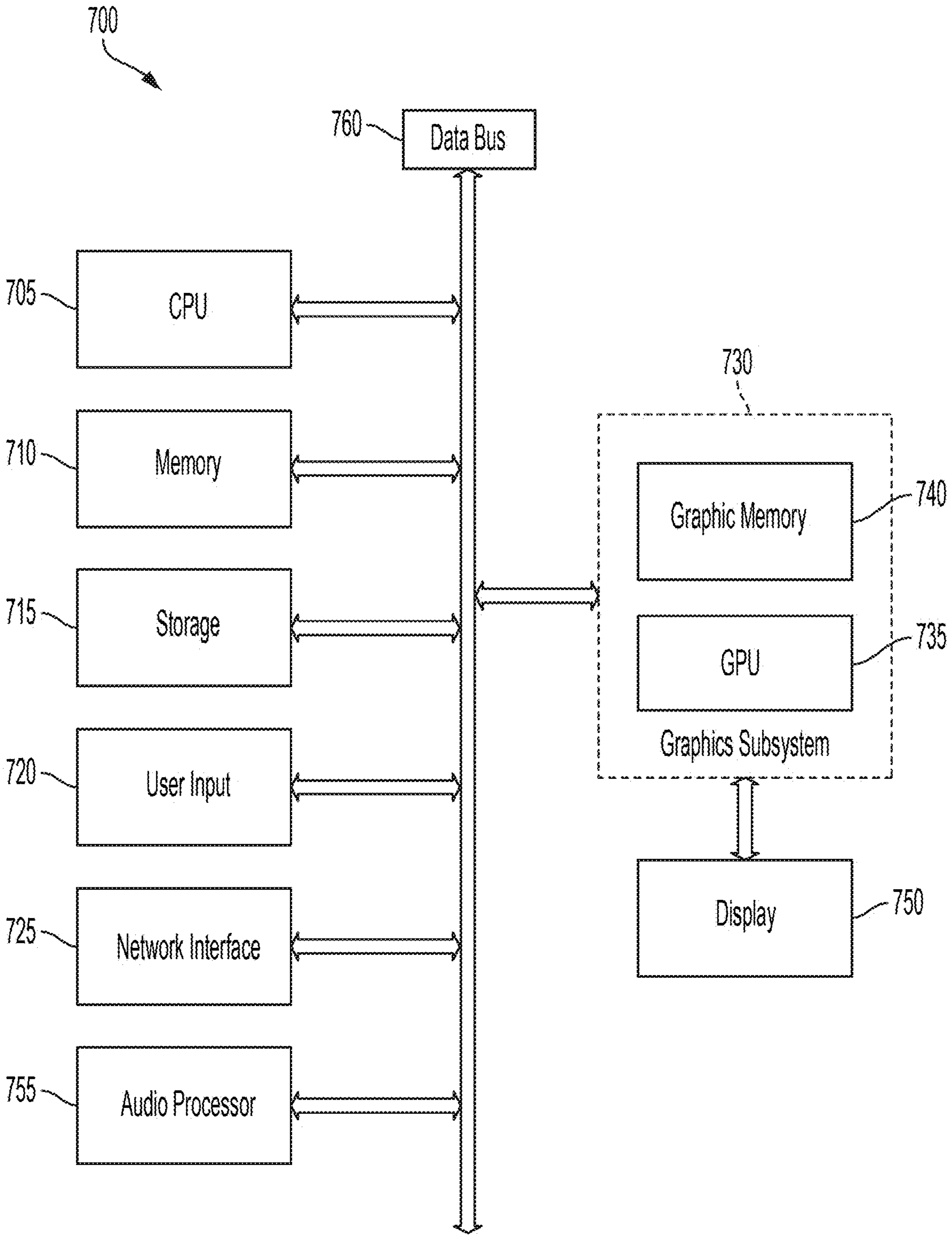
FIG. 7 illustrates an example of a hardware system suitable for implementing a computer system, according to embodiments of the present disclosure.

FIG. 7 illustrates an example of a hardware system suitable for implementing a computer system, according to embodiments of the present disclosure. The computer system 700 represents, for example, a video game system, a backend set of servers, or other types of a computer system. The computer system 700 includes a central processing unit (CPU) 705 for running software applications and optionally an operating system. The CPU 705 may be made up of one or more homogeneous or heterogeneous processing cores. Memory 710 stores applications and data for use by the CPU 705. Storage 715 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 720 communicate user inputs from one or more users to the computer system 700, examples of which may include keyboards, mice, joysticks, touch pads, touch screens, still or video cameras, and/or microphones. Network interface 725 allows the computer system 700 to communicate with other computer systems via an electronic communications network, and may include wired or wireless communication over local area networks and wide area networks such as the Internet. An audio processor 755 is adapted to generate analog or digital audio output from instructions and/or data provided by the CPU 705, memory 710, and/or storage 715. The components of computer system 700, including the CPU 705, memory 710, data storage 715, user input devices 720, network interface 725, and audio processor 755 are connected via one or more data buses 760.

A graphics subsystem 730 is further connected with the data bus 760 and the components of the computer system 700. The graphics subsystem 730 includes a graphics processing unit (GPU) 735 and graphics memory 740. The graphics memory 740 includes a display memory (e.g., a frame buffer) used for storing pixel data for each pixel of an output image. The graphics memory 740 can be integrated in the same device as the GPU 735, connected as a separate device with the GPU 735, and/or implemented within the memory 710. Pixel data can be provided to the graphics memory 740 directly from the CPU 705. Alternatively, the CPU 705 provides the GPU 735 with data and/or instructions defining the desired output images, from which the GPU 735 generates the pixel data of one or more output images. The data and/or instructions defining the desired output images can be stored in the memory 710 and/or graphics memory 740. In an embodiment, the GPU 735 includes 3D rendering capabilities for generating pixel data for output images from instructions and data defining the geometry, lighting, shading, texturing, motion, and/or camera parameters for a scene. The GPU 735 can further include one or more programmable execution units capable of executing shader programs.

The graphics subsystem 730 periodically outputs pixel data for an image from the graphics memory 740 to be displayed on the display device 750. The display device 750 can be any device capable of displaying visual information in response to a signal from the computer system 700, including CRT, LCD, plasma, and OLED displays. The computer system 700 can provide the display device 750 with an analog or digital signal.

In accordance with various embodiments, the CPU 705 is one or more general-purpose microprocessors having one or more processing cores. Further embodiments can be implemented using one or more CPUs 705 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 135%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of using ambient noise to augment video gameplay, the method comprising:

receiving input audio data from a microphone in a room of an electronic device used by a user;

detecting speech in the input audio data received from the microphone;

determining that the detected speech is from a background voice that is different from a user voice of the user based on a comparison between one or more features of the detected speech from the background voice and one or more features of collected speech from the user voice of the user;

isolating a plurality of segments of the input audio data, each corresponding to a phoneme of a plurality of phonemes in the detected speech from the background voice;

deriving parameters for each of the plurality of phonemes from corresponding segments of the plurality of segments of the input audio data;

receiving text for synthesis into artificial speech;

identifying, based on the text for synthesis, consonant phonemes and vowel phonemes represented in the text for synthesis;

determining that the plurality of phonemes in the detected speech includes phonemes associated with at least a threshold portion of the consonant phonemes and vowel phonemes represented in the text for synthesis;

determining, based on the plurality of phonemes in the detected speech including phonemes associated with the at least a threshold portion of the consonant phonemes and vowel phonemes represented in the text for synthesis, that the plurality of phonemes in the detected speech comprise a minimum number of unique phonemes sufficient for a generative artificial intelligence (AI) model to synthesize artificial speech corresponding to the text for synthesis;

inputting, in response to determining that the plurality of phonemes comprise the minimum number of unique phonemes, the text for synthesis and the parameters into the generative AI model for speech synthesis;

receiving, from the generative AI model, audio data including synthesized speech of the text; and playing the audio data.

2. The method of claim 1 wherein the user is playing a video game application on the electronic device, and the text for synthesis comes from the video game application.

3. The method of claim 2 further comprising:

rendering a character in the video game application to speak the synthesized speech.

4. The method of claim 2 further comprising:

generating or altering words in the text for synthesis based on gameplay in the video game application.

5. The method of claim 2 wherein the text for synthesis is for static content selected from the group consisting of pre-canned speech from a non-player character, help information, and accessibility content.

6. The method of claim 2 further comprising:

filtering synthesized speech in the audio data, the filtering selected from the group consisting of masculinizing or feminizing, aging or de-aging, and adjusting harmonics, pitch, or reverb.

7. The method of claim 6 wherein the filtering is based on a gender, apparent age, or size of a character rendered to speak the synthesized speech.

8. The method of claim 2 further comprising:

receiving, from the user, a selection of a non-player character among multiple non-player characters in the video game application to speak the synthesized speech.

9. The method of claim 1 wherein the background voice is a first background voice, the method further comprising:

detecting additional speech in the input audio data received from the microphone;

determining that the additional detected speech is from a second background voice that is different from the first background voice and the user voice;

isolating a second plurality of segments of the input audio data, each corresponding to phonemes in the additional detected speech from the second background voice;

deriving second parameters from the second plurality of segments of the input audio data;

mixing the parameters from the first background voice and the second parameters from the second background voice to generate mixed parameters, wherein inputting the parameters into the generative AI model for speech synthesis comprises inputting the mixed parameters into the generative AI model.

10. The method of claim 9 further comprising:

receiving, from the user, a command to avoid or stop using the second background voice.

11. The method of claim 9 wherein the background voice is a first background voice, the method further comprising:

distinguishing multiple other background voices from the first background voice and saving parameters derived from phonemes in the other background voices;

counting a number of the first and other background voices; and adjusting gameplay or audio of a video game application based on the number.

12. A non-transitory machine-readable tangible medium embodying information indicative of instructions for causing one or more machines to perform operations for using ambient noise to augment video gameplay, the instructions comprising:

receiving input audio data from a microphone in a room of an electronic device used by a user;

detecting speech in the input audio data received from the microphone;

determining that the detected speech is from a background voice that is different from a user voice of the user based on a comparison between one or more features of the detected speech from the background voice and one or more features of collected speech from the user voice of the user;

isolating a plurality of segments of the input audio data, each corresponding to a phoneme of a plurality of phonemes in the detected speech from the background voice;

deriving parameters for each of the plurality of phonemes from corresponding segments of the plurality of segments of the input audio data;

receiving text for synthesis into artificial speech;

identifying, based on the text for synthesis, consonant phonemes and vowel phonemes represented in the text for synthesis;

determining that the plurality of phonemes in the detected speech includes phonemes associated with at least a threshold portion of the consonant phonemes and vowel phonemes represented in the text for synthesis;

determining, based on the plurality of phonemes in the detected speech including phonemes associated with the at least a threshold portion of the consonant phonemes and vowel phonemes represented in the text for synthesis, that the plurality of phonemes in the detected speech comprise a minimum number of unique phonemes sufficient for a generative artificial intelligence (AI) model to synthesize artificial speech corresponding to the text for synthesis;

inputting, in response to determining that the plurality of phonemes comprise the minimum number of unique phonemes, the text for synthesis and the parameters into a generative artificial intelligence (AI) model for speech synthesis;

receiving, from the generative AI model, audio data including synthesized speech of the text; and playing the audio data.

13. The medium of claim 12 wherein the user is playing a video game application on the electronic device, and the text for synthesis comes from the video game application.

14. The medium of claim 13 wherein the instructions further comprise:

rendering a character in the video game application to speak the synthesized speech.

15. A system for optimizing input parameters for using ambient noise to augment video gameplay, the system comprising:

a memory; and at least one processor operatively coupled with the memory and executing program code from the memory for:

receiving input audio data from a microphone in a room of an electronic device used by a user;

detecting speech in the input audio data received from the microphone;

determining that the detected speech is from a background voice that is different from a user voice of the user based on a comparison between one or more features of the detected speech from the background voice and one or more features of collected speech from the user voice of the user;

isolating a plurality of segments of the input audio data, each corresponding to a phoneme of a plurality of phonemes in the detected speech from the background voice;

deriving parameters for each of the plurality of phonemes from corresponding segments of the plurality of segments of the input audio data;

receiving text for synthesis into artificial speech;

identifying, based on the text for synthesis, consonant phonemes and vowel phonemes represented in the text for synthesis;

determining that the plurality of phonemes in the detected speech includes phonemes associated with at least a threshold portion of the consonant phonemes and vowel phonemes represented in the text for synthesis;

determining, based on the plurality of phonemes in the detected speech including phonemes associated with the at least a threshold portion of the consonant phonemes and vowel phonemes represented in the text for synthesis, that the plurality of phonemes in the detected speech comprise a minimum number of unique phonemes sufficient for a generative artificial intelligence (AI) model to synthesize artificial speech corresponding to the text for synthesis;

inputting, in response to determining that the plurality of phonemes comprise the minimum number of unique phonemes, the text for synthesis and the parameters into the generative AI model for speech synthesis;

receiving, from the generative AI model, audio data including synthesized speech of the text; and playing the audio data.

16. The system of claim 15 wherein the user is playing a video game application on the electronic device, and the text for synthesis comes from the video game application.

17. The system of claim 16 wherein the program code further comprises:

rendering a character in the video game application to speak the synthesized speech.

* * * * *